F. O. BROCKHAUS.
VEHICLE BRAKE.
APPLICATION FILED DEC. 13, 1915.
1,201,684.
Patented Oct. 17, 1916.
2 SHEETS—SHEET 2.
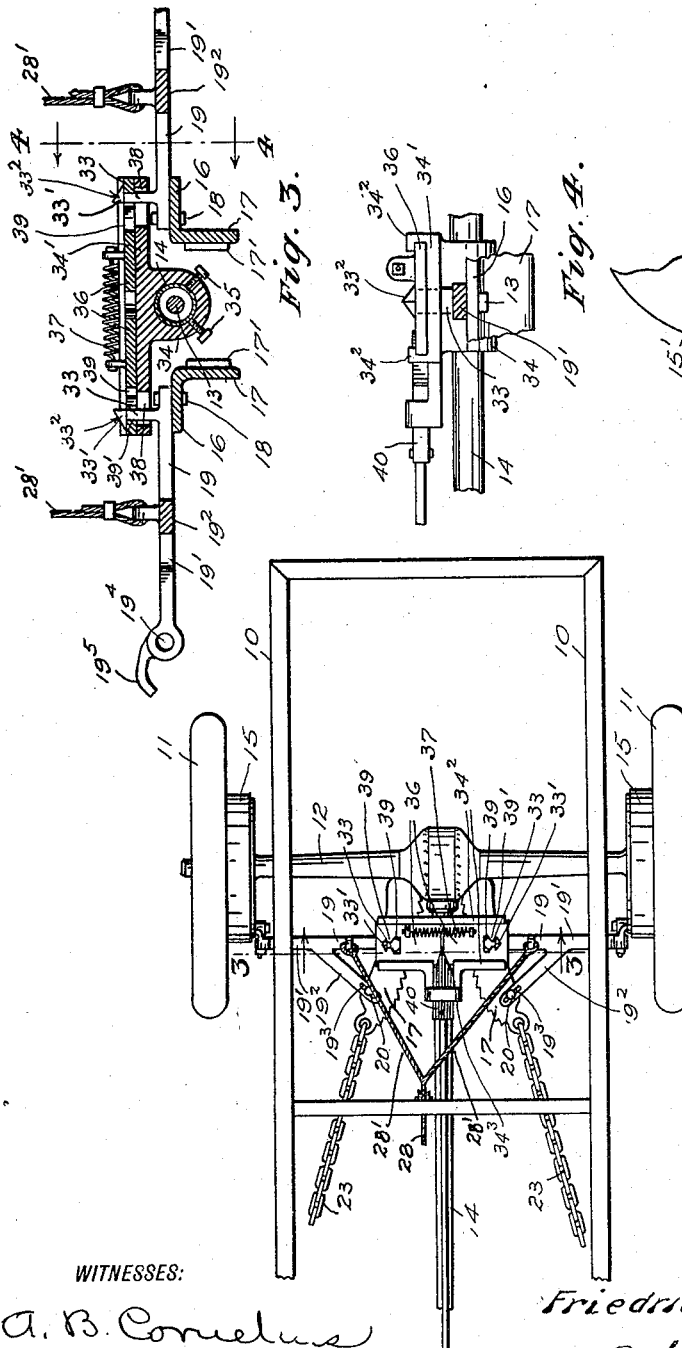
WITNESSES:
A. B. Cornelius
E. Peterson
INVENTOR
Friedrich O. Brockhaus
BY
Pierre Barnes
ATTORNEY

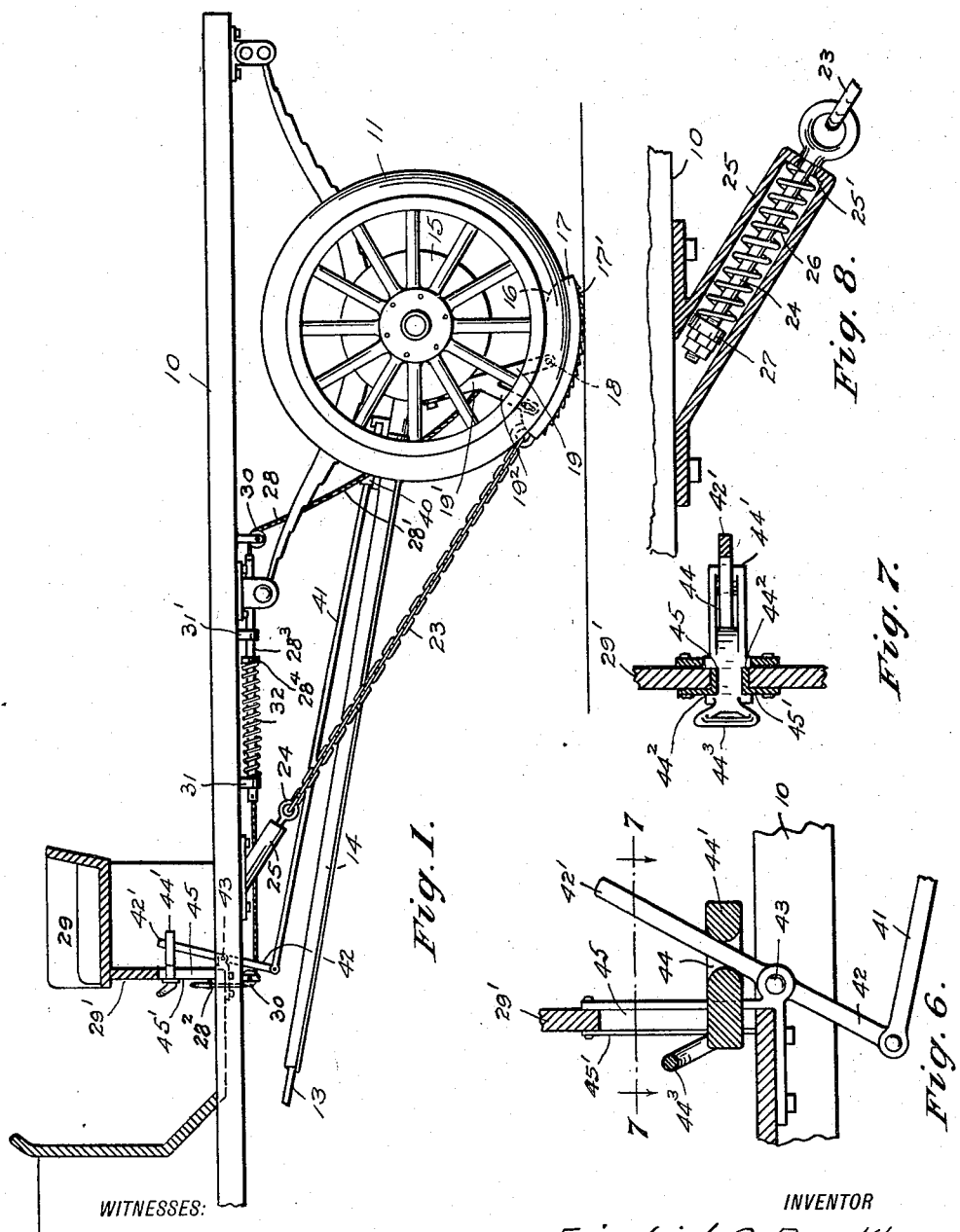

UNITED STATES PATENT OFFICE.

FRIEDRICH OTTO BROCKHAUS, OF PORT ANGELES, WASHINGTON.

VEHICLE-BRAKE.

1,201,684.

Specification of Letters Patent.

Patented Oct. 17, 1916.

Application filed December 13, 1915. Serial No. 66,452.

*To all whom it may concern:*

Be it known that I, FRIEDRICH O. BROCKHAUS, a citizen of the United States, residing at Port Angeles, in the county of Clallam and State of Washington, have invented certain new and useful Improvements in Vehicle-Brakes, of which the following is a specification.

This invention relates to vehicle brakes of the chock-block type; and its object is the provision of improved apparatus of this character and which is especially designed for automobiles.

The invention consists in the novel construction, adaptation and combination of parts, as will be hereinafter described and claimed.

In the accompanying drawings, Figure 1 is a view in side elevation of a portion of an automobile with my invention applied thereto. Fig. 2 is a plan view of the same. Fig. 3 is a transverse vertical section taken substantially through 3—3 of Fig. 2. Fig. 4 is a section through 4—4 of Fig. 3. Fig. 5 is a fragmentary side elevation of a brake casing such as usually carried on the rear axle housing of an automobile, and illustrating the hinge support and guide for one of the block-carrying arms, said arm being shown in section. Fig. 6 is a longitudinal vertical section of the lever and controlling means therefor which are utilized to cause the apparatus to become operative. Fig. 7 is a horizontal section through 7—7 of Fig. 6. Fig. 8 is a longitudinal vertical section of forward connections of one of the block chains.

Referring to the drawings, the numerals 10 designate the side rails of the frame or chassis of an automobile, 11 designates the rear wheels rotatable upon axles which are inclosed by the usual housing 12 and actuated by a power driven shaft 13 which extends through a tubular housing 14. Carried upon the ends of the axle housing are the casings 15 for the ordinary service brakes whose operating means and the radius-rod connections for preventing the casings 15 from turning have, for clearness, been omitted from the drawings. All of the above named parts are or may be such as are now usually employed in automobile practice.

In carrying out the present invention, I provide for each of the rear wheels a brake block comprising a side flange 16 and a tread flange 17 which is desirably formed on its under side with road-engaging teeth $17^1$.

A brake-block is pivotally connected at about its mid-length by a pin 18 with a branch 19 of a bifurcated hanger $19^1$ whose other branch $19^2$ is provided with a slot $19^3$ to receive a stud 20 secured to the block flange 16 in advance of the pivotal pin 18. Near its upper end a hanger $19^1$ is provided with a bore $19^4$, Fig. 5, through which extends the element 21 of an eye-bolt which is swiveled to the adjacent brake-casing 15 by bolt 22 passing through the eye of said eye-bolt. By such devices, a hanger is arranged to be swung about the axis of the element 21 in a direction transverse to the car and is furthermore movable about the axis of the bolt 22 in a direction longitudinal with respect to the car. These movements, however, are subject to the action of a finger $19^5$ provided on the hanger $19^1$ being engaged in a slot $15^1$ provided in the associated brake casing 15 until the rear end of a brake-shoe has reached the ground when the finger $19^5$ is withdrawn from said slot and the hanger swings rearwardly about the axis of bolt 22 to carry the shoe under the respective wheel which is effected by the forward travel of the car. The rearward movement of a hanger and its shoe is regulated by a chain 23 connecting the latter with a rod 24, Fig. 8, extending into a chambered attachment 25 and in opposition to a spring 26 interposed between the end wall $25^1$ of said attachment and a collar 27 which is adjustably secured to the rod. To swing the aforesaid hangers and shoes upwardly when unemployed, I provide hoisting devices comprising a cable 28 having at its rear branches $28^1$ connected to the respective hangers and having its forward end $28^2$ terminating within convenient reach of the driver's seat 29. Said cable is led about sheaves 30 and has desirably included in its length a rod element $28^3$ movable in guides 31 and $31^1$.

32 represents a spring acting between the guide 31 and a collar $28^4$ on the element $28^3$ tending to urge the latter rearwardly and render the cable parts to the rear thereof in a slack condition. Formed integral with or rigidly connected with each hanger $19^1$ is an arm 33 which terminates in an enlarged head $33^1$ to afford a shoulder on its side adjacent to the hanger and constitutes, in effect, a hook whereby the hanger when unengaged may be suspended from a support. This support, as best shown in Figs. 2, 3 and 4, consists in a body 34 rigidly secured to shaft housing 14, as by screws 35, and is provided with a table portion $34^1$ having flanges $34^2$ at its front and rear edges which serve as guideways for a pair of slidable plates 36. The latter are yieldingly held in juxtaposition with each other by means of a spring 37. The supporting table $34^1$ is provided with apertures 38 of sizes to enable the heads $33^1$ of arms 33 to freely pass therethrough. The plates 36 are each provided with a longitudinal slot 39 through which the heads of the respective arms may pass and communicating with each of the slots 39 is a transverse slot $39^1$ of less width than said head, but which will accommodate the arm-part therebelow. When the hangers are raised through the instrumentality of the above-described hoisting cable, the sloping faces $33^2$ encounter the outer edges of the slots 39 to cause the plates 36 to be thrust outwardly in opposition to the spring 37 until the heads $33^1$ have passed through these slots, whereupon the power of the spring asserts itself to retract the plates so that the arms 33 will be within the slots $39^1$ which, being of less width than the heads, will prevent the hangers being swung down. To release the hangers, I provide a wedge-piece 40 guided in a way $34^3$ of the table $34^1$ and arranged to be moved rearwardly between the plates 36 to cause the separation of the same and thereby carry the slots 39 beneath the heads $33^1$ of the arms, whereupon the then unsupported weight of the hangers $19^1$ and the shoes thereon will effect the falling of the free ends of the hangers. The wedge-piece 40 is operated through the agency of a connecting rod 41 from an upright lever 42 which is fulcrumed at 43. The upper arm $42^1$ of said lever extends through an aperture 44 of a block $44^1$ which is slidable in a vertical slot 45 of a guide $45^1$ which, as illustrated, is secured to the foot-board $29^1$ of the seat. The block $44^1$ is provided with spaced shoulders $44^2$ which coact with the opposing faces of the guide $45^1$ to prevent any horizontal movements of the block.

$44^3$ represents a handle provided on the block, whereby the same may be conveniently raised from the position in which it is represented in Fig. 6 to that in which it is shown in Fig. 1 to swing the lever to impart a rearward movement to the wedge-piece 40 such as will force the plates 36 asunder or in hanger-releasing positions. When the block 44 is restored to the Fig. 6 position, the lever is influenced to disengage the wedge-piece from the plates and allow the spring 37 to again become operative to draw the latter together.

The operation of the invention is as follows: Assuming that the brake shoes are held in their inoperative positions illustrated in Figs. 2 and 3 by the hanger-arms 33 having their heads $33^1$ supported by the slidable plates 36; to release the hangers, the operator elevates the block $44^1$ to actuate the lever 42 to cause the connecting rod 41 to impart rearward movement to the wedge-piece 40, resulting in the separation of the plates 36 to allow the heads $33^1$ which are supported by said plates to be drawn downwardly by the weight of the hangers through the plate slots 39. The hangers upon being thus released, will swing downwardly about the axes of the respective bolt elements 21 until the tread flanges 17 of the brake-blocks encounter the ground in advance of the wheels 11. At or about the time this occurs, the hanger fingers $19^5$ will be withdrawn from the casing slots $15^1$ whereby the hangers are rendered free for movements about the axes of the bolts 22 and the blocks will, by reason of the forward travel of the car, be arrested by engagement with the ground until the wheels 11 mount the block flanges.

The chains 23 limit the relative backward travel of the shoes and the forward travel of the shoes due to the momentum of the automobile will be overcome by the frictional resistance of the shoes, supplemented by the engagement of the block-teeth $17^1$, with respect to the ground. To restore the hangers, etc., to their inoperative positions, the automobile is backed to carry the wheels 11 from the blocks; the operator then pulls the cable connection $28^2$ to primarily draw the hangers forwardly and then upwardly to successively engage the hanger-fingers $19^5$ into engagement with the slots $15^1$ of the casings 15. A continued pull upon the cable carries the arms 33 through apertures 38 of the table $34^1$ and impinges the sloping faces $33^2$ of the arm heads against the plates to push them asunder until the slots 39 of the plates are brought into positions whereat the heads $33^1$ will pass to above the table and be engaged upon the tops of the same when the plates are drawn together by the spring 37. The function of the rod element $28^3$ of the cable connection and the spring 32 therefor is to yieldingly hold the cable to the rear of the element $28^3$ in slack condition so as not to interfere with the rapid falling of the hangers in an emergency application.

What I claim is,—

1. In a vehicle, hangers hingedly connected thereto, brake-locks attached to the outer ends of the respective hangers, said hangers being arranged to be successively swung about their hinge connections laterally downward and rearward to carry said brake-blocks under the traction wheels of the vehicle, and means connected with the vehicle frame to limit the rearward movements of the hangers and the brake-blocks thereof.

2. In a vehicle, hangers hingedly connected thereto for both lateral and longitudinal swinging movements, brake-blocks attached to the outer ends of said hangers, spring actuated means to support said hangers in elevated disengaged positions, means actuated by the driver to release said hangers from said support, means to regulate the movements of said hangers to carry the respective brake-blocks laterally to the ground in front of the vehicle rear wheels, and thence direct the brake-blocks rearward under said wheels in the progressive travel of the vehicle, and means to limit the relative rearward movements of said brake-blocks.

3. In a vehicle, hangers hingedly connected thereto, brake-blocks carried by the outer ends of said hangers, means for elevating said hangers into inoperative positions, supports engageable by said hangers in the elevating of the latter for releasably sustaining the same in such inoperative positions, means actuated by the driver to effect the release of said hangers from the supports, and means engageable with the hangers whereby the latter, upon being released, are caused to be swung laterally in carrying the brake-blocks to the ground in front of the rear wheels of the vehicle.

4. In a vehicle, the combination with the rear wheels, and the brake-casings therefor, of hangers hingedly connected to the respective casings for movements transverse and longitudinal of the vehicle, brake-blocks attached to the free ends of the respective hangers, arms provided with relatively large outer extremities provided on said hangers, a support rigidly secured to the vehicle, plates slidably mounted on said support and provided with slots whereby the aforesaid extremities of the hanger-arms may be engaged by the plates when the latter are in certain relative positions, a spring for yieldingly retaining said plates in the referred to positions, and lever-actuated means to move said plates in opposition to the spring into positions to disengage said arm-extremities for releasing said hangers with respect to the support.

5. In a vehicle, the combination with the rear wheels and the brake-casings therefor, of hangers hingedly connected to the respective casings for movements transverse and longitudinal of the vehicle, brake-blocks attached to the free ends of the respective hangers, arms provided with relatively large outer extremities provided on said hangers, a support rigidly secured to the vehicle, plates slidably mounted on said support and provided with slots whereby the aforesaid extremities of the hanger arms may be engaged by the plates when the latter are in certain relative positions, a spring for yieldingly retaining said plates in the referred to positions, lever-actuated means to move said plates in opposition to the spring into positions to disengage said arm extremities for releasing said hangers with respect to the support, and an apertured block engaging said lever-actuating means for securing the same in both operative and inoperative positions.

Signed at Port Angeles, Wash., this 27th day of November, 1915.

FRIEDRICH OTTO BROCKHAUS.

Witnesses:
S. J. LUTZ,
C. J. HASWELL.

Copies of this patent may be obtained for five cents each, by addressing the "Commissioner of Patents, Washington, D. C."